United States Patent [19]
Hicks

[11] Patent Number: 5,152,474
[45] Date of Patent: Oct. 6, 1992

[54] SELF-CENTERING GUIDE SPINDLE

[76] Inventor: Ray Hicks, 2605 Corunna Rd., Flint, Mich. 48503

[21] Appl. No.: 657,638

[22] Filed: Feb. 19, 1991

[51] Int. Cl.⁵ .............................................. B65H 23/26
[52] U.S. Cl. ................................. 242/67.3 R; 242/76; 226/189; 226/190
[58] Field of Search ................... 242/67.3 R, 76, 75.3; 226/189–194, 196, 198, 199

[56] References Cited

U.S. PATENT DOCUMENTS

| | | | |
|---|---|---|---|
| 1,882,413 | 10/1932 | Edouart | 226/190 |
| 2,120,735 | 6/1938 | DeBrie | 226/191 |
| 3,474,981 | 10/1969 | Polder | 242/67.3 R |
| 3,575,100 | 4/1971 | Krause | 226/189 X |
| 3,604,650 | 9/1971 | Wennerberg | 242/67.3 R X |

Primary Examiner—John M. Jillions
Attorney, Agent, or Firm—Krass & Young

[57] ABSTRACT

The invention is an improved spindle for guiding photographic film, paper and similar flexible materials subject to handling and transport in long rolls. The spindle is constructed of lightweight material, and features two pairs of curved shoulders, each of specific radius. The first shoulder supports the transported materials at opposing edges, and spaces the material away from the central portion of the spindle. The second shoulder protects the edge of the material, centers the material on the spindle, and guides the material to a centered position on the spindle in the event the material becomes inadvertently mis-centered.

4 Claims, 2 Drawing Sheets

SELF-CENTERING GUIDE SPINDLE

FIELD OF THE INVENTION

The invention pertains to transport mechanisms for guiding materials subject to processing in long rolls, and, more specifically, to spindles for retaining and centering long roll materials.

BACKGROUND OF THE INVENTION

Photographic films and papers are regularly handled in long rolls. The length of the roll may be as short as several inches, or, in the case of high volume commercial photography, several hundred feet. The processing of such long rolls of materials requires attention to cost, speed, product safety, simplicity and reliability.

A variety of pieces of commercial photographic processing equipment are equipped with film or paper transport mechanisms. This equipment includes, but is not limited to: printers, developers, punches, editors, negative baggers and print baggers. Typically, photographic equipment which processes long rolls of film or paper operates in an automated or semi-automated manner. In this fashion, the equipment processes, sequentially, a series of photographic exposures with minimal operator intervention. By way of example, a spool of developed photographic film may be placed in an automated photographic printer which locates the optical center of each individual negative on the long roll, applies exposure correction factors, exposes one section of a long roll of photographic paper from said negative, and advances the film roll to the next exposure. This entire cycle may take less than one second. In this interval, both the photographic negative material and the photographic paper must be accelerated, decelerated and fixed in precise position and correlation.

Problems occur in transporting both long roll paper and negative in this environment. Placement of the materials on the optical center of the equipment is critical. Present centering methods require the use of a pair of movable retaining collars on a rotating shaft. These retaining collars serve to capture the long roll material at the edges, guiding the material between the collars. However, most commercial photographic processing equipment utilizes several such shaft/collar guide combinations, which establish a three dimensional path over which the long roll material travels.

Accordingly, the physical location of each pair of retaining collars on each guide shaft must correspond precisely to each pair of collars on every other shaft. Further, the position of each pair of retaining collars on each shaft must correspond precisely to the physical dimension of the material being transported. Finally, the position of the retaining collars must be set to insure positioning of the film or paper in precise relationship to the optical center of the photographic processing equipment. The set up of the existing shaft/collar combinations is, accordingly, time-consuming and fraught with error.

Moreover, the existing guides have a tendency to damage film edges. The collars presently known feature a bearing surface for the material edge that is essentially perpendicular to the material transported. Film and photographic paper edges are relatively fragile, and are often notched or punched for identification purposes, which serves to further weaken the edge. When long roll material fails (particularly film negatives), it is common for the long roll material to split along the longitudinal axis of the long roll material, creating a tear that may extend across several individual frames or exposures. Protection of the material edge is, therefore, of paramount interest during transport.

The operations of threading, and guiding at high speed, often result in misalignment of the transported material in relation to the guide shaft/collar combination. The material may tend to "climb" the edge of the collar, thereby disengaging the long roll material from the guide path. In an automated environment, the material drive mechanism may continue to operate, resulting in continuous feeding of disengaged long roll material, which results in certain damage to the transported material, and frequent damage to the material transport mechanism. This tendency to climb is most pronounced when the material is spliced. Then stiffness of the transported material is usually reduced at the splice, whereas the tension on the long roll material remains constant during transport. Under these conditions, the spliced section of the material buckles toward the longitudinal center of the material. In this configuration, the material edge presents a reduced edge dimension to the guide collar surface, facilitating the tendency of the material to climb out of the space between the guide collars.

The present invention is an improved spindle mechanism to replace the paired collars on each shaft, which overcomes the many shortcomings of the current equipment.

SUMMARY OF THE INVENTION

The present invention is a unitary material guide for use in transporting long roll materials. It comprises a spindle of predetermined length, having a center guide section and two retainer sections disposed at the ends of the spindle. Each retainer section is further comprised of an inner support shoulder and an outer centering shoulder. The material transported is threaded between the retainer sections wherein it is supported at the edges and captured in the space between the retainer sections.

Each spindle may be part of a matched set having identical dimensions. The longitudinal dimension of the center guide section of each spindle in such that a matched set corresponds to the width of the long roll material being transported, e.g., a width of 35 mm for a standard roll of 35 mm film. The longitudinal dimension of each retainer section corresponds to the support distance required between the film edge and the corresponding spindle end, to insure the film optical center is disposed in desired physical relation to the optical center of the photographic equipment. In this fashion, the operator of the equipment may select, and quickly mount, a plurality of material guides on a transport mechanism, without the need for separate gauges or measuring devices. The operator can likewise be certain that the material will fit precisely in the guides, and be positioned in an exact relationship to the complete transport mechanism. Further, the unique design of the retainer portion of the spindle minimizes the risk of damage to the material edge, and encourages tracking of the material toward the center section of the spindle in the event of misalignment of the material.

DESCRIPTION OF THE DRAWINGS

The above features and objects of the invention will be best understood by reference to the within written description, and the drawings in which.

DESCRIPTION OF THE PREFERRED EMBODIMENT

Figure 1:
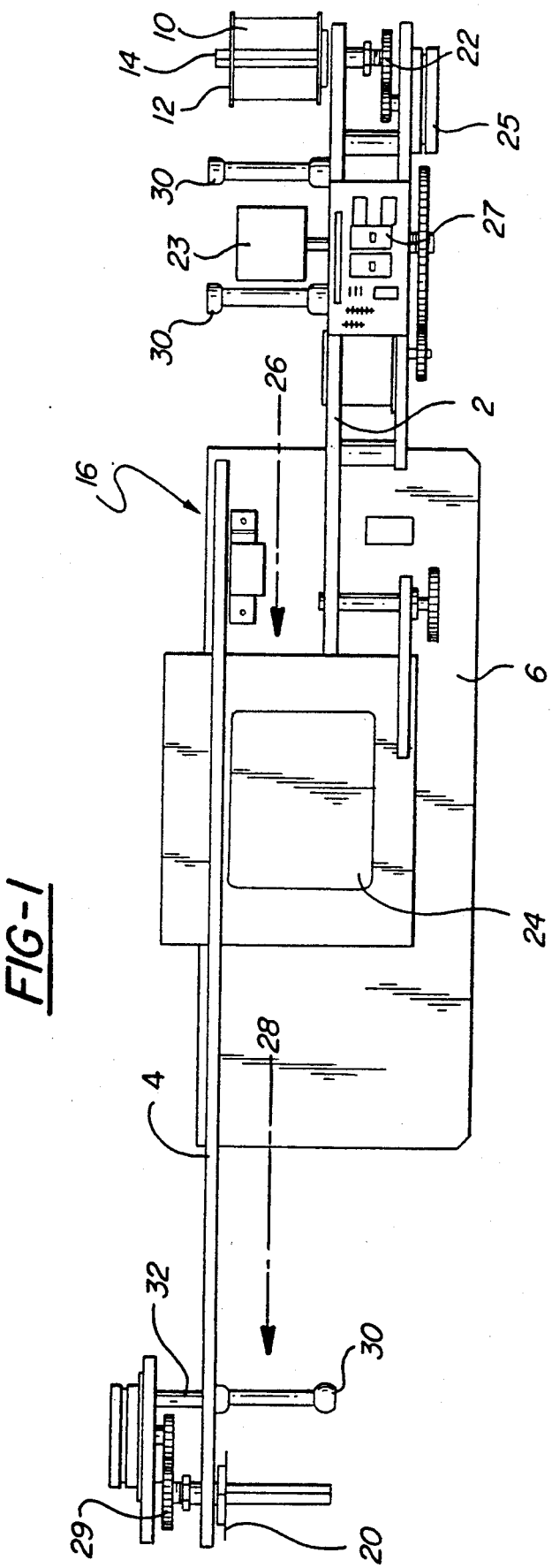
FIG. 1 is a top view of a long roll material transport device incorporating the invention.

In one embodiment of the invention, as shown in FIG. 1, a long roll of developed photographic film 10 is wound on a feed spool 12, which, in turn, is removably mounted to a film spool holder 14 on a photographic film drive mechanism 16. This type of drive mechanism 16 may typically be found on a photographic editor, printer or the like, and comprises an attachment plate 6, a feed spool 12, a take-up spool 20, a drive mechanism 22, a negative stage 24, a film feed path 26, a film take-up path 28, a base 2 on which the feed components are mounted and a base 4 on which the take-up components are mounted.

The film 10 is progressively unwound from said feed spool 12 by a drive mechanism, which may be in the form of a pressure roller (not shown), a drive roller 23, and a drive motor 25 driving said drive roller. In the present embodiment, individual frames of the long roll of film 10 are sequentially presented to the negative stage 24, which corresponds physically to the operation associated with the photographic equipment on which the film drive mechanism is mounted. For example, if the film drive is mounted to an automated photographic printer, the negative stage 24 takes the form of an aperture in which each individual frame on said long roll is suspended during exposure of the photographic paper. A film motion control section 27 serves to intermittently advance the film 10 according to operator or machine instructions.

Beyond the negative stage 24 in the preferred embodiment, a removable film take-up spool 20 connects to a second drive mechanism 29, which serves to collect the long roll negative for storage and future processing.

To insure reliable centering of the long roll negative throughout the path of the drive mechanism, a plurality of spindles 30 are mounted along the feed path 26 and take-up path 28 of the drive mechanism. In the preferred embodiment, at least one of the spindles 30 may be affixed to a tensioning shaft 32, which is spring biased to maintain a desired tension on the long roll negative. Each said spindle 30 is of identical shape and dimension. In this fashion, the width of the film can be precisely matched to the center section of each spindle, and the overall position of the longitudinal centerline of the film can be precisely maintained in relation to the centerline of the negative stage.

Figure 2:
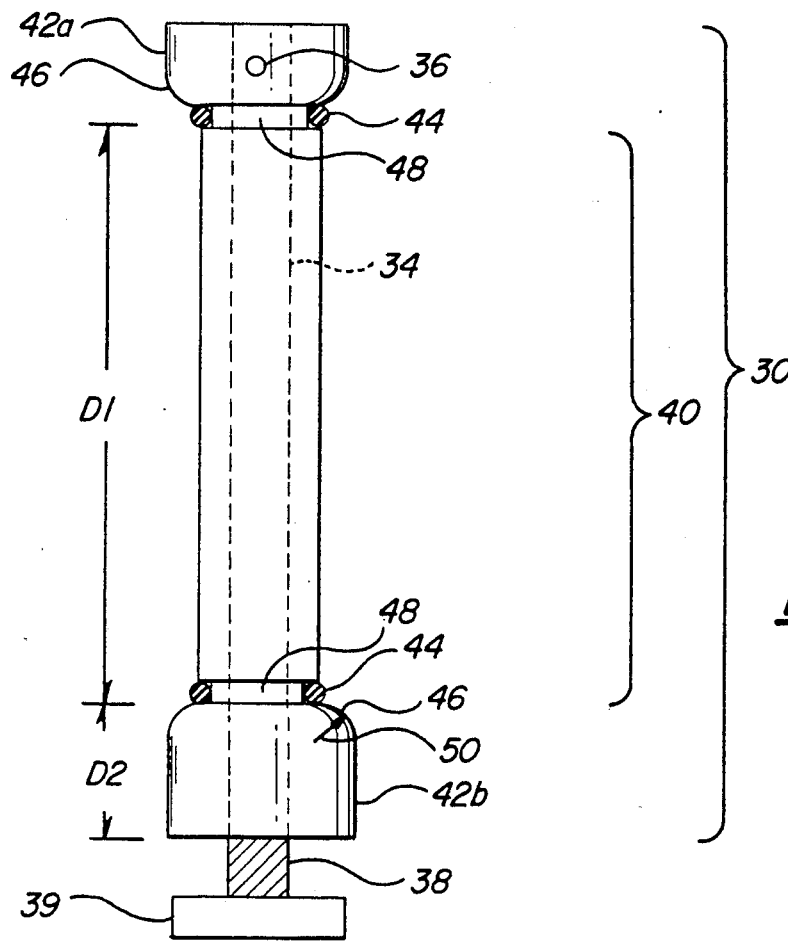
FIG. 2 is a front view of the invention, showing the elements thereof.
Figure 3:
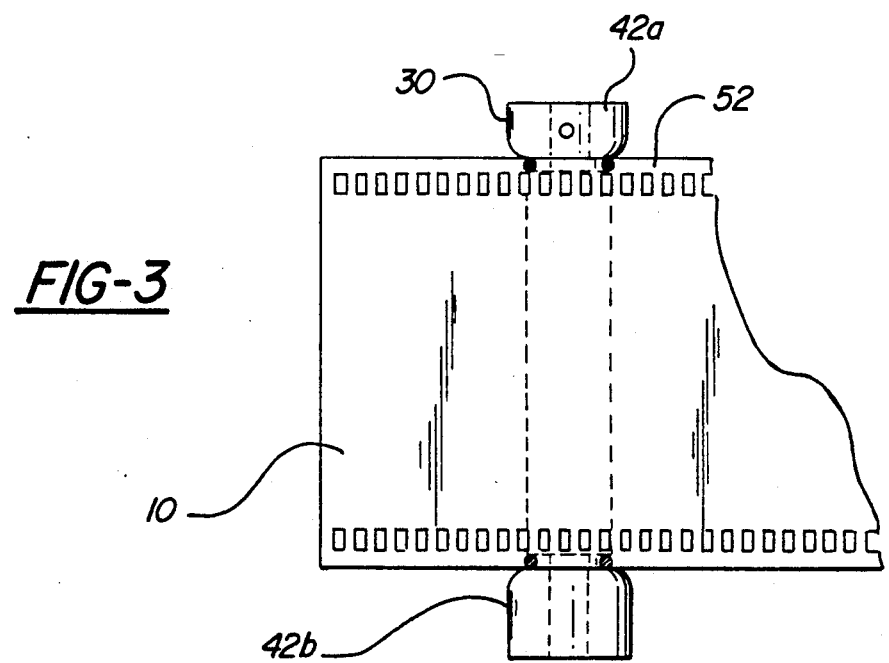
FIG. 3 is a front view of the invention, also displaying the typical placement of material within the invention for transport.

The function of each element of the spindle can best be learned from a study of FIGS. 2 and 3. In this drawing the various spindle sections are shown in elevation. The spindle 30 is cast or machined from a solid cylinder of light weight, low abrasion material such as Delrin TM. A center bore 34 is provided in the spindle to fit a mounting shaft, which is typically rotatably mounted to the drive mechanism base using bearing means 39. An allen screw 36 is threadably mounted through the spindle 30, and placed to allow securing and removal of the spindle to the shaft 38.

The center section 40 of the spindle 30 is defined by an area offset inwardly toward the spindle centerline. The longitudinal dimension D1 of each center section corresponds to the width of the long roll film being transported Each spindle is provided with retainer sections 42a, b at each end. As shown in the cross sectional view, each retainer section is further comprised of an annular inner shoulder section 44 and an outer shoulder 46. The inner shoulder section 44 preferably takes the form of a flexible O-ring, which is captured in an annular groove 48 abutting the outer shoulder 46. Alternately, the inner shoulder 44 may be cast or machined as an integral part of the spindle 30. The inner shoulder 44 serves to grip the film edge 52, and to space the film center away from the spindle center section, thereby minimizing abrasion damage to the film surface.

The outer shoulder 46 is fabricated with a radius 50 of 0.093 to 0.125 inches, said radius beginning at the outermost edge of the annular groove, and continuing through an arc of 90°. The inner shoulder is fabricated with a radius of 0.050–0.055 inches. These radii have been proven to be effective in recentering long roll materials that have become misaligned on the spindle, in much the same fashion as the crown on a conveyor belt roller centers a drifting belt.

Either retainer section may be dimensioned to positively locate the long roll material longitudinal centerline in desired relationship to the drive mechanism. In FIG. 2, the spindle shown has one elongated retainer section 42b to space the film a desired distance $D_2$ from the drive mechanism base. In the preferred embodiment, a matching set of spindles 30 are mounted in the various feed and take-up path positions within the drive mechanism, eliminating the need for measurements relating to retaining collar spacing, and insuring uniform spacing of the film longitudinal centerline from the film drive mechanism base, and precise alignment of the film longitudinal centerline on all spindles 30 mounted to the bases 2 and 4.

Having described my invention, it will be apparent to those skilled in the art that many modifications and variations in the design may be made, without departing from the essence of the invention, which I claim as follows:

1. A spindle for guiding a section of a continuous strip of flexible material comprising:
    a. a substantially cylindrical center section;
    b. a pair of substantially cylindrical retaining end sections located at opposing ends of said center section, having a cylindrical diameter greater than the cylindrical diameter of said center section, and each said end section having a transitional surface portion joining said end section and said center section, said transitional surface portion being defined, in cross section, by a radius;
    c. a pair of annular shoulders of substantially semicircular cross-section wherein one of each said pair of annular shoulders is affixed to the circumference of said center section adjacent to one of each said transitional surface portions, the outer circumference of each said annular shoulders being greater than the outer diameter of said center section and lesser than the outer diameter of either of said end sections.

2. In a drive mechanism for a continuous strip for flexible material, said drive mechanism having a base, a feed spool, a take-up spool, and a plurality of guide means for guiding said material between said spools, the improvement comprising:
    a plurality of guide spindles having:

a. a substantially cylindrical center section;
b. a pair of substantially cylindrical retaining end sections located at opposing ends of said center section, having a cylindrical diameter greater than the cylindrical diameter of said center section, and each said end section having a transitional surface portion joining said end section and said center section, said transitional surface portion being defined, in cross section, by a radius;
c. a pair of annular shoulders of substantially semicircular cross-section wherein one of each said pair of annular shoulders is affixed to the circumference of said center section adjacent to one of each said transitional surface portions, the outer circumference of each said annular shoulders being greater than the outer diameter of said center section and lesser than the outer diameter of either of said end sections.

3. The invention of claim 2, wherein the length of said center section corresponds to the width of said material.

4. The invention of claim 3, wherein the longitudinal dimension of one of each said retaining end sections on each said guide spindle corresponds to a predetermined distance between said base and one edge of said strip of said material.

* * * * *